(12) United States Patent
Zhang et al.

(10) Patent No.: US 9,921,102 B2
(45) Date of Patent: Mar. 20, 2018

(54) MOVING PLATFORM BORNE INFRARED IMAGE-SPECTRUM ASSOCIATED DETECTION SYSTEM AND METHOD

(71) Applicant: HUAZHONG UNIVERSITY OF SCIENCE AND TECHNOLOGY, Wuhan, Hubei (CN)

(72) Inventors: Tianxu Zhang, Hubei (CN); Xiaobing Dai, Hubei (CN); Xiangyan Liu, Hubei (CN); Jindong Fei, Hubei (CN); Li Liu, Hubei (CN); Hongtao Yu, Hubei (CN); Shoukui Yao, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/104,905

(22) PCT Filed: Feb. 10, 2015

(86) PCT No.: PCT/CN2015/072667
§ 371 (c)(1),
(2) Date: Jun. 15, 2016

(87) PCT Pub. No.: WO2016/106953
PCT Pub. Date: Jul. 7, 2016

(65) Prior Publication Data
US 2016/0370227 A1 Dec. 22, 2016

(30) Foreign Application Priority Data
Dec. 30, 2014 (CN) .......................... 2014 1 0849148

(51) Int. Cl.
*G01J 3/02* (2006.01)
*H04N 5/33* (2006.01)
(Continued)

(52) U.S. Cl.
CPC ............ *G01J 3/0202* (2013.01); *G01H 9/004* (2013.01); *G01J 3/021* (2013.01); *G01J 3/0208* (2013.01);
(Continued)

(58) Field of Classification Search
CPC ............... H04N 5/2251; H04N 5/2254; H04N 5/23241; H04N 5/2252; H04N 5/33;
(Continued)

(56) References Cited

U.S. PATENT DOCUMENTS 6,743,486 B1 * 6/2004 Miyazawa ................ B24B 9/14
351/159.69
8,330,087 B2 12/2012 Domenicali
(Continued)

FOREIGN PATENT DOCUMENTS

CN 101702021 5/2010
CN 101738619 6/2010
(Continued)

*Primary Examiner* — Mohammed Jebari
(74) *Attorney, Agent, or Firm* — Hamre, Schumann, Mueller & Larson, P.C.

(57) ABSTRACT

A moving platform borne infrared image-spectrum associated detection system includes an optical hood, a broadband optical system, a two-dimensional servo system, an infrared optical fiber, a Fourier interference spectrum module, an image-spectrum associated detection processing module, a power supply module, and a display module. Incident light enters from the optical hood to the broadband optical system, and is split by a spectroscope. Transmitted light is focused by a long-wave imaging lens group on an infrared detector for imaging. Reflected light is focused by a broadband spectrum lens group to an optical fiber coupler, enters the Fourier interference spectrum module through the infrared optical fiber to form an interference pattern, and undergoes Fourier transform to obtain spectral data.

10 Claims, 13 Drawing Sheets

(51) Int. Cl.
  *G01J 3/45* (2006.01)
  *G01H 9/00* (2006.01)
  *G01J 3/28* (2006.01)
  *H04N 5/225* (2006.01)
  *H04N 5/232* (2006.01)

(52) U.S. Cl.
  CPC ........... *G01J 3/0218* (2013.01); *G01J 3/0264* (2013.01); *G01J 3/2823* (2013.01); *G01J 3/45* (2013.01); *H04N 5/2251* (2013.01); *H04N 5/2252* (2013.01); *H04N 5/2254* (2013.01); *H04N 5/23241* (2013.01); *H04N 5/33* (2013.01); *G01J 2003/2836* (2013.01)

(58) Field of Classification Search
  CPC .. H04N 3/09; G01J 3/45; G01J 3/0218; G01J 3/0264; G01J 3/021; G01J 3/0208; G01J 3/0202; G01J 3/2823; G01J 2003/2836; G01J 5/52; G01H 9/004; G02B 26/101; G09F 19/18
  See application file for complete search history.

(56) References Cited

U.S. PATENT DOCUMENTS

| | | | | |
|---|---|---|---|---|
| 2006/0109668 | A1* | 5/2006 | Schmieder | G02B 7/022 362/455 |
| 2013/0214164 | A1* | 8/2013 | Zhang | G01J 5/0022 250/339.14 |
| 2016/0327682 | A1* | 11/2016 | Zhang | G01J 3/453 |

FOREIGN PATENT DOCUMENTS

| | | |
|---|---|---|
| CN | 102564589 | 7/2012 |
| CN | 103776540 | 5/2014 |
| CN | 103777348 | 5/2014 |
| JP | 2009139352 | 6/2009 |

* cited by examiner

MOVING PLATFORM BORNE INFRARED IMAGE-SPECTRUM ASSOCIATED DETECTION SYSTEM AND METHOD

TECHNICAL FIELD

The present invention relates to the field of photoelectric technology, and in particular, to a moving platform borne infrared image-spectrum associated detection system and method.

BACKGROUND ART

In recent years, as airborne and satellite borne moving platforms develop rapidly, design of photoelectric detection payload faces a new challenge. According to a structure and characteristic of an electromagnetic spectrum, multiple pieces of fine spectrum band information can represent inherent characteristics of a target and a background more thoroughly and correctly. An image-spectrum associated detection device integrates an infrared spectrum and infrared imaging information of a target, and utilizes unique spectral signatures of the target on the infrared spectral line, thereby greatly improving the detectability of the target. The technology is widely applied in the field of photoelectric technology, and provides a data basis for researching various target characteristics and further performing classification, monitoring and target detection and identification on a scene.

Research and development on this type of photoelectric detection device receives much attention around the world. For example, an AVIPIS system accomplished by the JPL laboratory of America and a GERIS system of the GER company of America, as well as a PHI imaging spectrometer system researched by Shanghai Institute of Technical Physics, CAS, and the like. This type of imaging spectrometer can provide abundant tow-dimensional spatial information and third-dimensional spectral data; however, the spatial resolution is low, the imaging speed is low, and intelligent collection on an infrared spectrum of a moving target cannot be implemented. A large amount of hyperspectral data and information unrelated to an object are acquired, the data redundancy is huge, and airborne real-time processing cannot be implemented. A photoelectric reconnoitering and Advanced Targeting Forward-Looking Infrared (ATFLIR) such as an AN-AAS-38A/B eagle-type ATFLIR and an AN/AAR-50 ATFLIR has the capability of detecting and tracking a moving target by mans of infrared image data collection. However, this type of devices do not have the capability of detecting an infrared spectrum of the moving target, and has poor infrared decoy disturbance resistance; and a man-in-loop measure is used during detection and tracking of the moving target, so that a communication link is easily disturbed, and it lacks of an intelligent automatic target identification function.

In related patents, in Chinese patent applications No. 200910272679.9 entitled "Method for obtaining spectrum-integrated time-varying target optical spectrum information and device thereof" and No. 201110430969.9 entitled "Spectral characteristic detection identification method for multi-wave-band moving objects and device thereof", a combination of two lens is used to implement the image-spectrum association, the device is large in volume. The scanning mirror causes the whole optical path layout to waste a half of the space of field-of-view (FOV), and the influence of moving disturbance on the detection is hard to be isolated. A planar infrared window is used, so that the FOV is small, and it is inapplicable to aerodynamic configuration in a moving condition.

For design of an infrared photoelectric payload of a moving platform, currently used photoelectric devices have the following defects: (1) they are inapplicable to local area spectrum measurement of the moving platform; (2) they cannot implement automatic tracking and spectrum measurement of multiple moving targets; (3) they cannot perform online processing and identification of target spectrums; and (4) the data amount is huge, the speed is low, and the cost is high.

SUMMARY

Directed to the above detects or improvement requirements of the prior art, the present invention provides a moving platform borne infrared image-spectrum associated detection system and method, which aims to implementing time-space-spectrum multi-dimensional integrated information measurement of a moving platform moving target or a local area, thereby solving the technical problem of moving platform disturbance decoupling and optimizing optical path layout of the system.

The present invention provides a moving platform borne infrared image-spectrum associated detection system, wrapped in a protective shell, and including an optical hood, a broadband optical system, a two-dimensional servo system, an infrared optical fiber, a Fourier interference spectrum module, an image-spectrum associated detection processing module, a power supply module, and a display module. The optical hood is connected to the shell through adhesive. A centroid of the broadband optical system is overlapped with a center of sphere of the optical hood, and the broadband optical system is fixed to a pitching mechanism of the two-dimensional servo system to implement two-dimensional movements. A base of the two-dimensional servo system is fixedly mounted in the shell, and a center of gyration of the two-dimensional servo system is overlapped with a centroidal axis of the broadband optical system. The infrared optical fiber is flexibly connected to the broadband optical system and the Fourier interference spectrum module respectively. The Fourier interference spectrum module is fixed in the shell with a spring. The power supply module is used to supply power to the system and provide a universal power interface. The display module is embedded in an outer surface at a tail portion of the shell.

Further, the optical hood is a spherical structure formed by using an eZnS material as a base material, and performing machine shaping, polishing, and coating.

Further, the broadband optical system includes a secondary mirror, a primary mirror, a spectroscope, a long-wave lens group, a broadband spectrum lens group, an infrared detector, and an infrared optical fiber coupler. The secondary mirror and the primary mirror are placed sequentially and coaxially, and form a Cassegrain lens. A mirror plane center of the spectroscope is overlapped with a center axis of the system, a mirror plane of the spectroscope is placed to form an angle of 45° with the center axis, a first surface of the spectroscope is coated with a beam splitting film, and a second surface thereof is coated with a long-wave antireflection film. The long-wave lens group is located on a transmission optical path of the spectroscope, for long-wave imaging. The broadband spectrum lens group is located on a reflection optical path of the spectroscope, for correcting chromatic aberration of position and chromatic aberration of magnification of broadband spectrum imaging, thereby implementing collection of spectral energy. The infrared detector is disposed at the tail portion of the long-wave lens group, and an exit pupil of the long-wave lens group is overlapped with an internal photosurface of the infrared detector. The infrared optical fiber coupler is disposed at the rear portion of the broadband spectrum lens group, and an end surface of the infrared optical fiber coupler is overlapped with an exit pupil of the broadband spectrum lens group.

Further, the long-wave lens group includes a first concave lens, a second concave lens, a first planoconvex lens, a third concave lens and a second planoconvex lens that are disposed sequentially and coaxially.

Further, the broadband spectrum lens group includes two concave lenses and a crescent convex lens disposed sequentially and coaxially, and followed by two planoconvex lenses.

Further, the two-dimensional servo system includes an azimuth rotary transforming assembly, an azimuth motor, an azimuth mechanism, a pitching motor, a pitching mechanism, a pitching rotary transforming assembly, and a gyroscope. The pitching motor and the pitching rotary transforming assembly are respectively disposed at two sides of the pitching mechanism. The azimuth rotary transforming assembly and the azimuth motor are overlapped and disposed at an axis of the azimuth mechanism, and the azimuth mechanism is coupled to the pitching mechanism above it through a mechanical frame, so as to control the broadband optical system, thereby implementing pitching and azimuth two-dimensional movements. The gyroscope is disposed under the broadband optical system, for measuring a spatial absolute angular velocity of the broadband optical system and an angle tracking error signal of the platform, and using them as feedback signals to implement disturbance decoupling and movement isolation.

Further, the gyroscope is a fiber-optic gyroscope.

The present invention provides a detection method based on the moving platform borne infrared image-spectrum associated detection system, including the following steps:

(1) performing an imaging processing on a target scene through infrared detection, and acquiring image data;

(2) extracting all suspected targets and target position coordinate information from an image sequence of the image data;

(3) according to the position coordinate information of all the suspected targets, sequentially moving a center of field of view (FOV) to the target positions to lock a target;

(4) after a target is locked, collecting infrared spectral data of the target, and marking that the target has been measured; and (5) repeating steps (1) to (4) and starting the next collection cycle, until infrared spectral data of all targets is collected.

Further, in the step (2), the suspected target refers to several pixel points closely connected in the image, and a region of interest is extracted, specifically including:

(21) performing an enhancement processing on the image;

(22) performing a segmentation processing on the image after the enhancement processing; and

(23) performing dilation and erosion processing on the image after the segmentation processing, and acquiring the suspected target.

Further, it is considered that the target is locked successfully when the following principles are met simultaneously, where a principle (a) is that the center of FOV and the target have a stable relative position relation; and a principle (b) is that the target is located in a range of 5 pixels from the center of FOV.

In brief, the technical solution of the present invention is compared with the prior art, where the optical hood adopts ZnS of a spherical stricture, a system measurement FOV can be increased, a measurement blind angle can be reduced, and a good aerodynamic configuration may be provided at the same time; the two-dimensional servo system controls the broadband optical system, system disturbance of the moving platform may be effectively isolated, thereby implementing flexible FOV switching and quick target tracking; the broadband optical system adopts a reflection-transmission structure, so that a common optical path of FOV imaging and local spectrum measurement can be implemented; and image-spectrum associated processing adopts the optimal automatic control strategy, so that time-space-spectrum multi-dimensional sparse sampling on the target scene by the system can be implemented, the data amount is simplified, the measurement value is implemented to the maximum extent, and real-time processing is implemented.

where, 1—optical hood, 2—broadband optical system, 21—secondary mirror, 22—primary mirror, 23—spectroscope, 24—long-wave imaging lens group, 25—broadband spectrum lens group, 26—infrared detector, 27—infrared optical fiber coupler, 3—two-dimensional servo system, 4—infrared optical fiber, 5—Fourier interference spectrum module, 6—image-spectrum associated detection processing module, 61—image processing unit, 62—communication level switch unit, 63—system control unit, 64—spectrum processing unit, 65—data storage unit, 66—data merging total control unit, 7—power supply module, 8—display module.

DETAILED DESCRIPTION

In order that the objectives, technical solutions and advantages of the present invention become more comprehensible, the present invention is further described in detail through the accompanying drawings and the embodiments. It should be understood that, the specific embodiments described herein are merely used to explain the present invention, and are not intended to limit the present invention.

The present invention relates to a moving platform borne infrared image-spectrum associated detection system and an infrared image-spectrum associated detection and collection method implemented based on the system, especially relates to an infrared image and spectrum measurement system and method for a moving target of a moving platform. The present invention is a smart infrared photoelectric detection device, which is portable.

Figure 1:
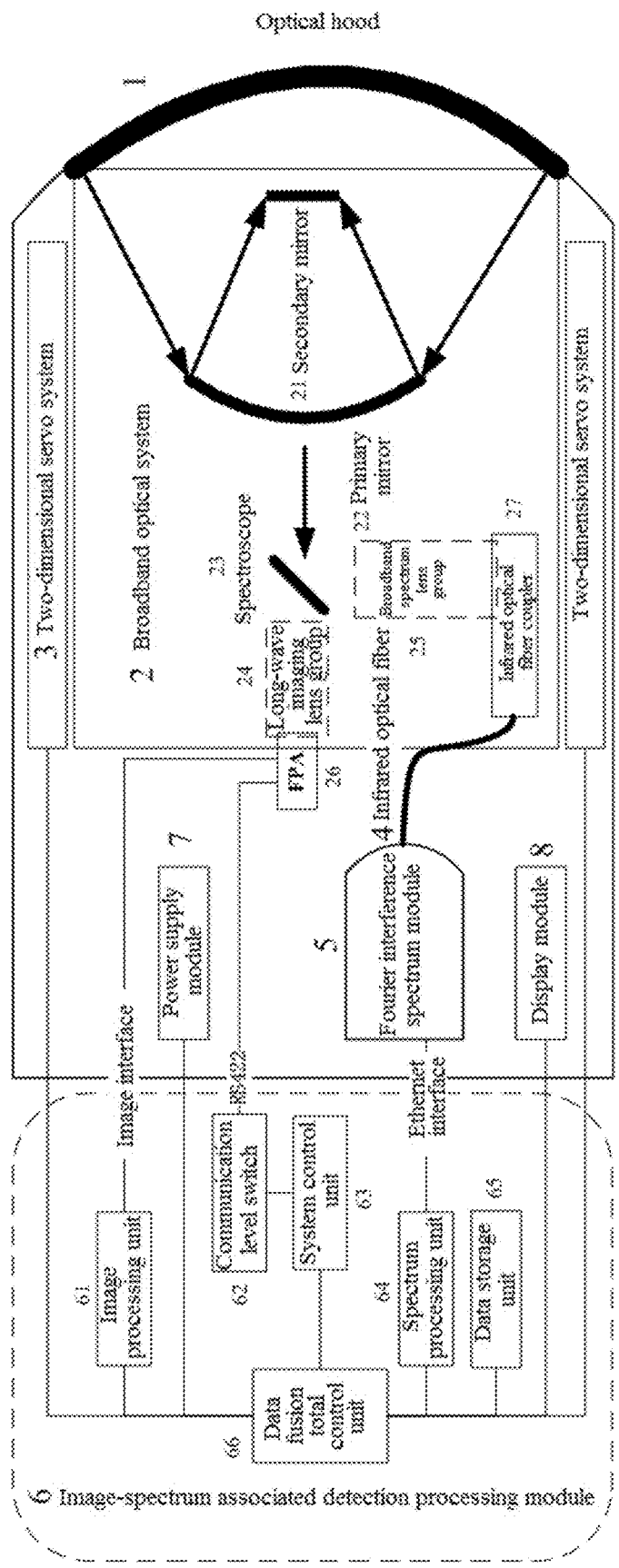
FIG. 1 is a schematic structural diagram of modules of an image-spectrum associated detection system provided in an embodiment of the present invention.

The present invention provides a moving platform borne infrared image-spectrum associated detection system, referring to FIG. 1, the system mainly includes an optical hood 1, a broadband optical system 2, a two-dimensional servo system 3, an infrared optical fiber 4, a Fourier interference spectrum module 5, an image-spectrum associated detection processing module 6, a power supply module 7, and a display module 8.

The "broadband" mentioned in the present invention refers to that the range of the response wave band of the system is wide, relating to short, medium and long waves, and specifically covering 2-12 μm. The "broadband spectrum" also refers to a 2-12 μm spectrum. The system is mainly divided into a processor entity and an optical machine detection entity in term of physical structure. The processor entity is formed by the image-spectrum associated detection processing module 6, and other parts form the optical machine detection entity. The former mainly implements all information processing works of the system, and the latter implements optical detection works of the whole system.

The processor entity performs connection control on the Fourier interference spectrum module 5 by using an Ethernet interface, and acquires infrared spectral data; implements position control on the two-dimensional servo system 2 by using a serial bus; and connects to the broadband optical system 4 by using an RS422 interface and an image interface. The RS422 interface implements level switch, controls lens focusing and non-uniform correction. The image interface has an analog PAL system and a digital Camera LINK interface, thereby implementing acquisition of infrared image information.

The optical machine detection entity is wrapped by a dedicatedly designed protective shell, and the shell is made of an aluminum alloy material. The optical hood 1 is connected to the shell through adhesive. A centroid of the broadband optical system 2 is overlapped with a center of sphere of the optical hood 1, and the broadband optical system 2 is fixed to a pitching mechanism of the two-dimensional servo system 3 to implement two-dimensional movements. A base of the two-dimensional servo system 3 is fixedly mounted in the shell, and a center of gyration of the two-dimensional servo system 3 is overlapped with a centroidal axis of the broadband optical system 2. The infrared optical fiber 4 is flexibly connected to the broadband optical system 2 and the Fourier interference spectrum module 5 respectively. The Fourier interference spectrum module 5 is fixed in the shell with a simple anti-rattler spring. The power supply module 7 supplies power to the system and provides a universal power interface to facilitate the use of an external power supply. The display module 8 adopts a touch-control liquid crystal display, and is embedded in an outer surface at a tail portion of the shell.

The optical hood 1 is used for transmitting infrared light in the target scene and filtering other stray light, and at the same time, the optical hood 1 also implements isolation of the interior of the system from the outside, thereby protecting the system. In a condition of a high-speed platform, the optical hood 1 has a desirable aerodynamic configuration, and reduces the effect of aerodynamic heating on system detection.

Figure 2:
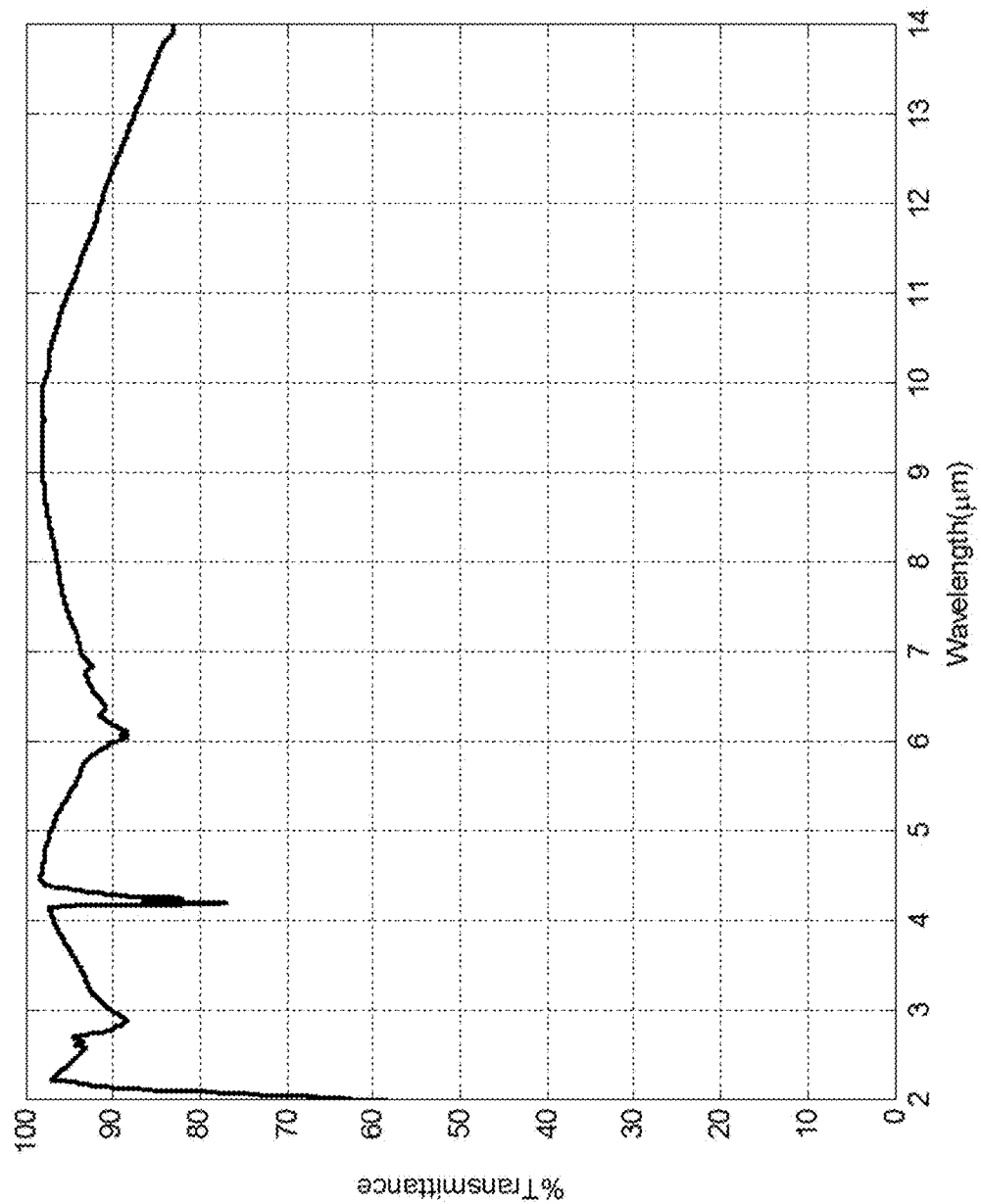
FIG. 2 is a breakthrough curve of an optical hood in an image-spectrum associated detection system provided in an embodiment of the present invention.

The optical hood 1 adopts an eZnS material as a base material, and performs machine shaping, polishing, and coating. The transmission band (FIG. 2) of the eZnS is 0.35~14.5 μm, and it has a good transmittance at 2~12 μm, where an average transmittance thereof may be up to more than 73%, the stability of optical performance is good, and the transmittance thereof is basically unchanged below the temperature of 400° C. In term of mechanical performance, the ZnS is constructed by fine grains, has high breaking strength and hardness, and has good erosion resistance. The using temperature of ZnS may be up to 800° C., and it has good thermal impact force.

As an embodiment of the present invention, the optical hood 1 adopts a spherical structure, which has good aerodynamic configuration in a moving platform condition, and can further increase the visible FOV of the system window, and reduce the detection blind angle of the system.

Figure 3A:
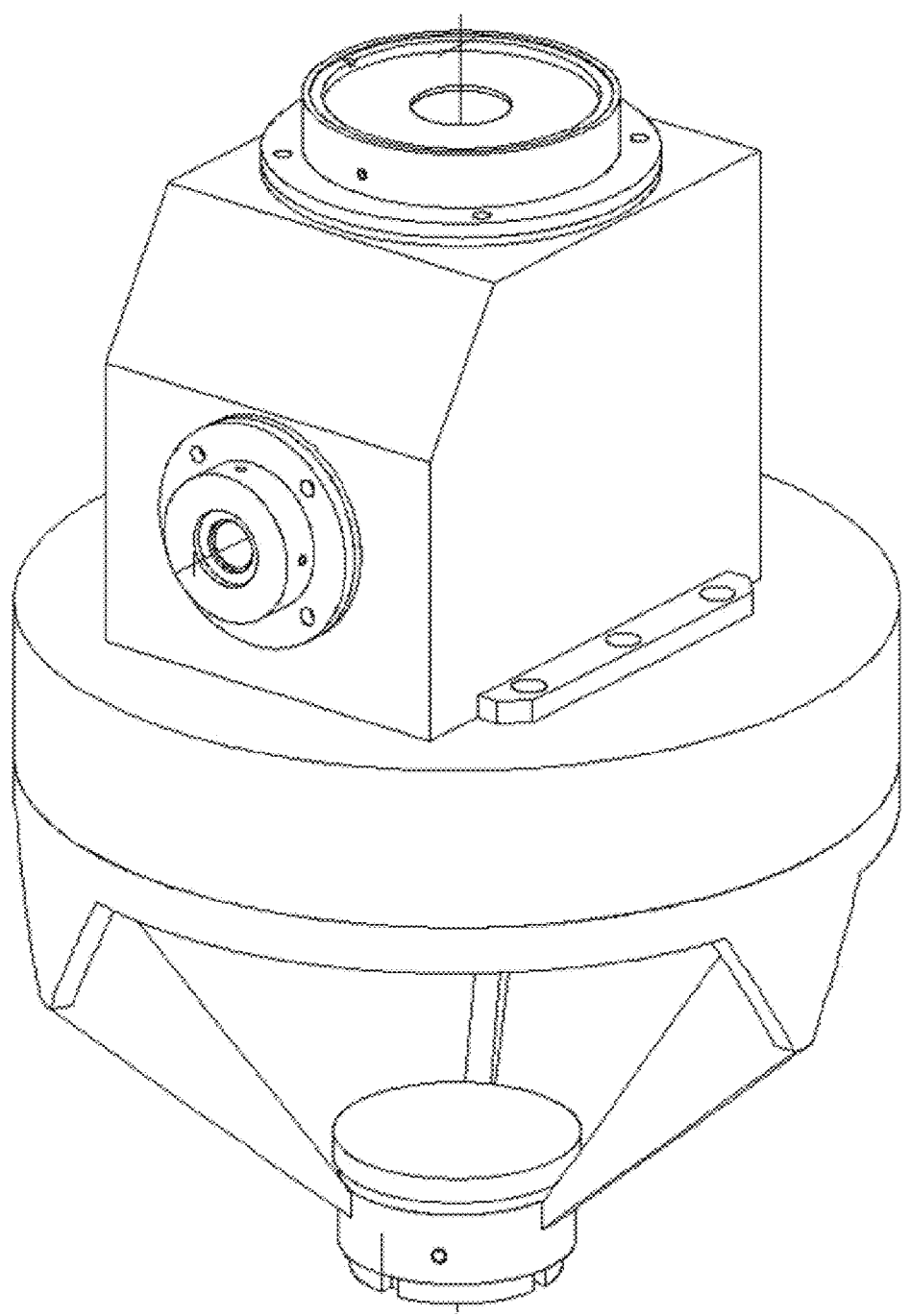
FIG. 3 is a schematic structural diagram of a broadband optical system in an image-spectrum associated detection system provided in an embodiment of the present invention, where a is a three-dimensional configuration, b is a front view, and c is a side view.
Figure 3B:
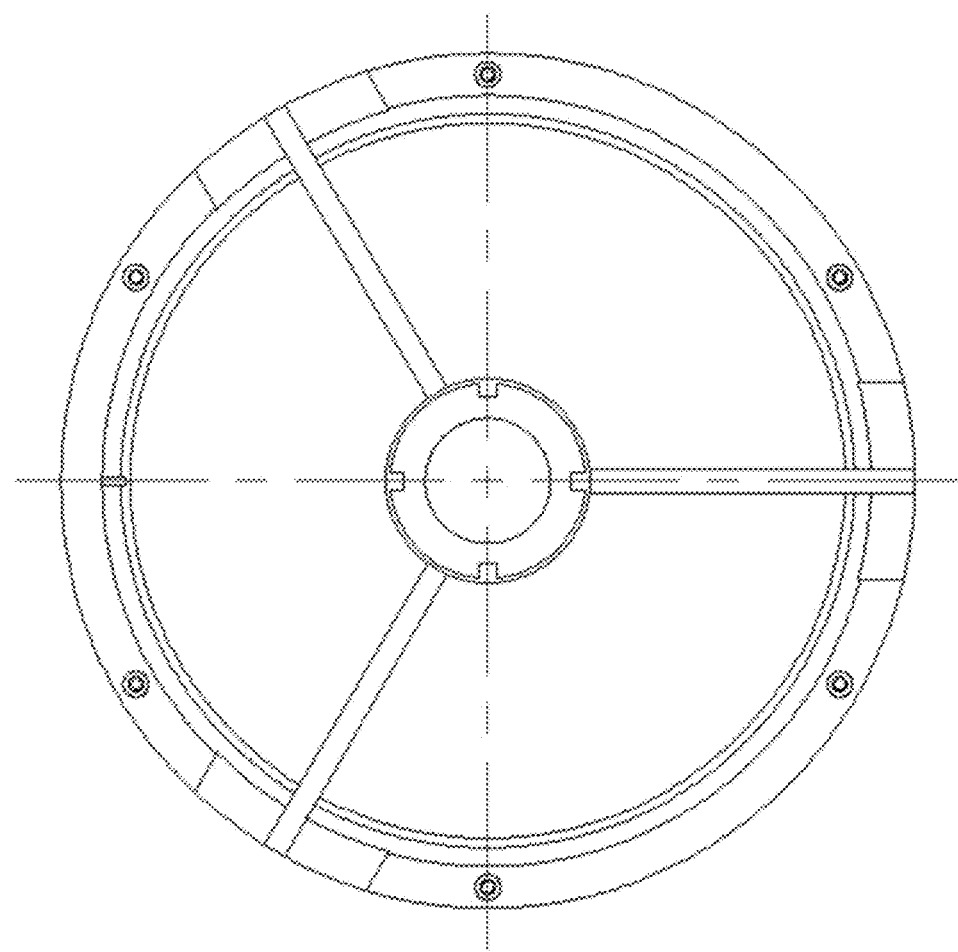
Figure 3C:
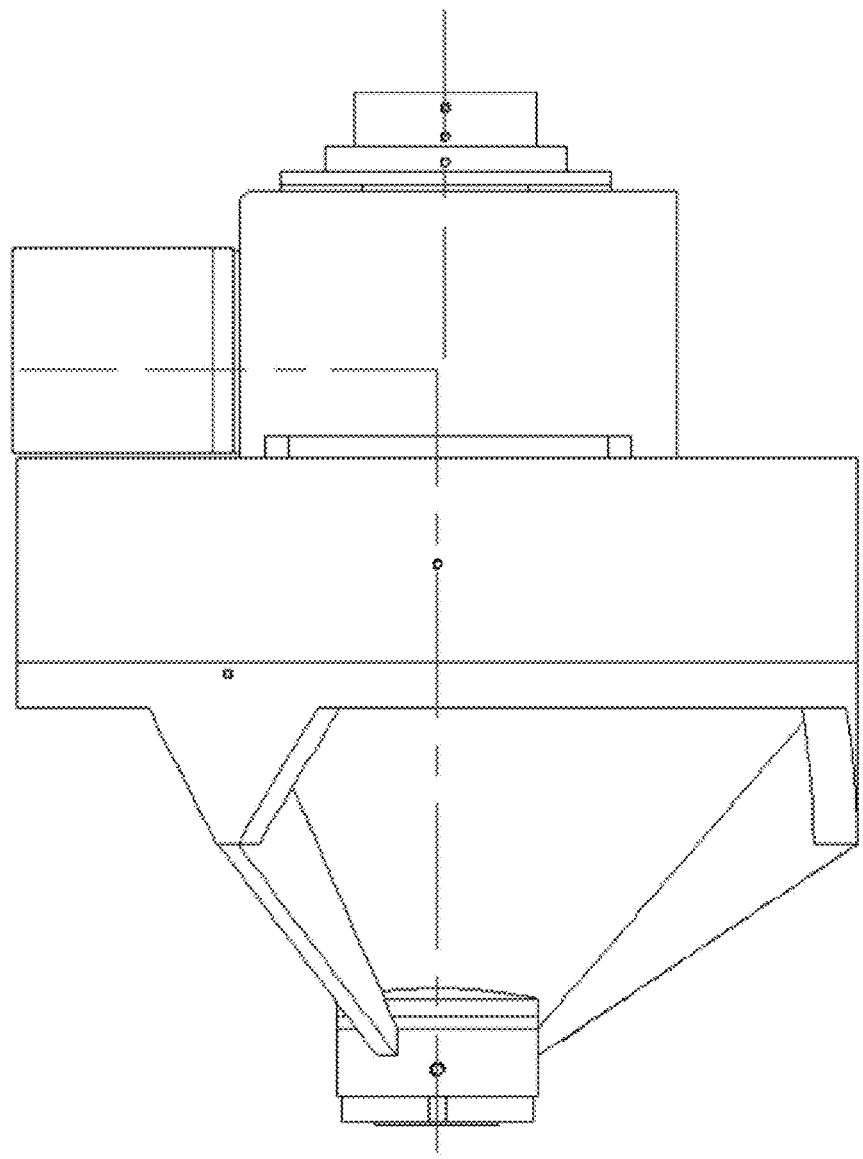

The broadband optical system 2 provided in the embodiment of the present invention includes a secondary mirror 21, a primary mirror 22, a spectroscope 23, a long-wave lens group 24, a broadband spectrum lens group 25, an infrared detector 26 and an infrared optical fiber coupler 27. The secondary mirror 21 is in front of the primary mirror 22, and they are disposed coaxially to construct a Cassegrain lens; a high-order non-spherical reflector is used to fold the optical path and compress the volume of the optical system; and a center axis of the Cassegrain lens is overlapped with a center axis of the system. A mirror plane center of the spectroscope 23 is overlapped with the center axis of the system, a mirror plane of the spectroscope 23 is placed to form an angle of 45° with the center axis, and the spectroscope 23 is coated with a beam splitting film (a first surface) and a long-wave antireflection film (a second surface). The long-wave lens group 24 is disposed behind the spectroscope 23, and located on the transmission optical path of the spectroscope 23, mainly for long-wave imaging. The broadband spectrum lens group 25 is disposed behind the spectroscope 23, and located on the reflection optical path of the spectroscope 23, for correcting the chromatic aberration of position and chromatic aberration of magnification of the broadband spectrum imaging, thereby implementing spectral energy collection. The infrared detector 26 is mounted at the tail portion of the long-wave lens group 24, and an exit pupil of the long-wave lens group 24 is overlapped with an internal photosurface of the infrared detector. The infrared optical fiber coupler 27 is disposed at the rear portion of the broadband spectrum lens group 25, and an end surface of the infrared optical fiber coupler 27 is overlapped with an exit pupil of the broadband spectrum lens group 25. The configuration of the broadband optical system 2 (not provided with the infrared detector 26) is shown in FIG. 3, where a is a schematic three-dimensional diagram of the system; b is a front view, mainly showing structures of the primary mirror and the secondary mirror and a mounting relation thereof; and c is a side view.

Figure 4A:
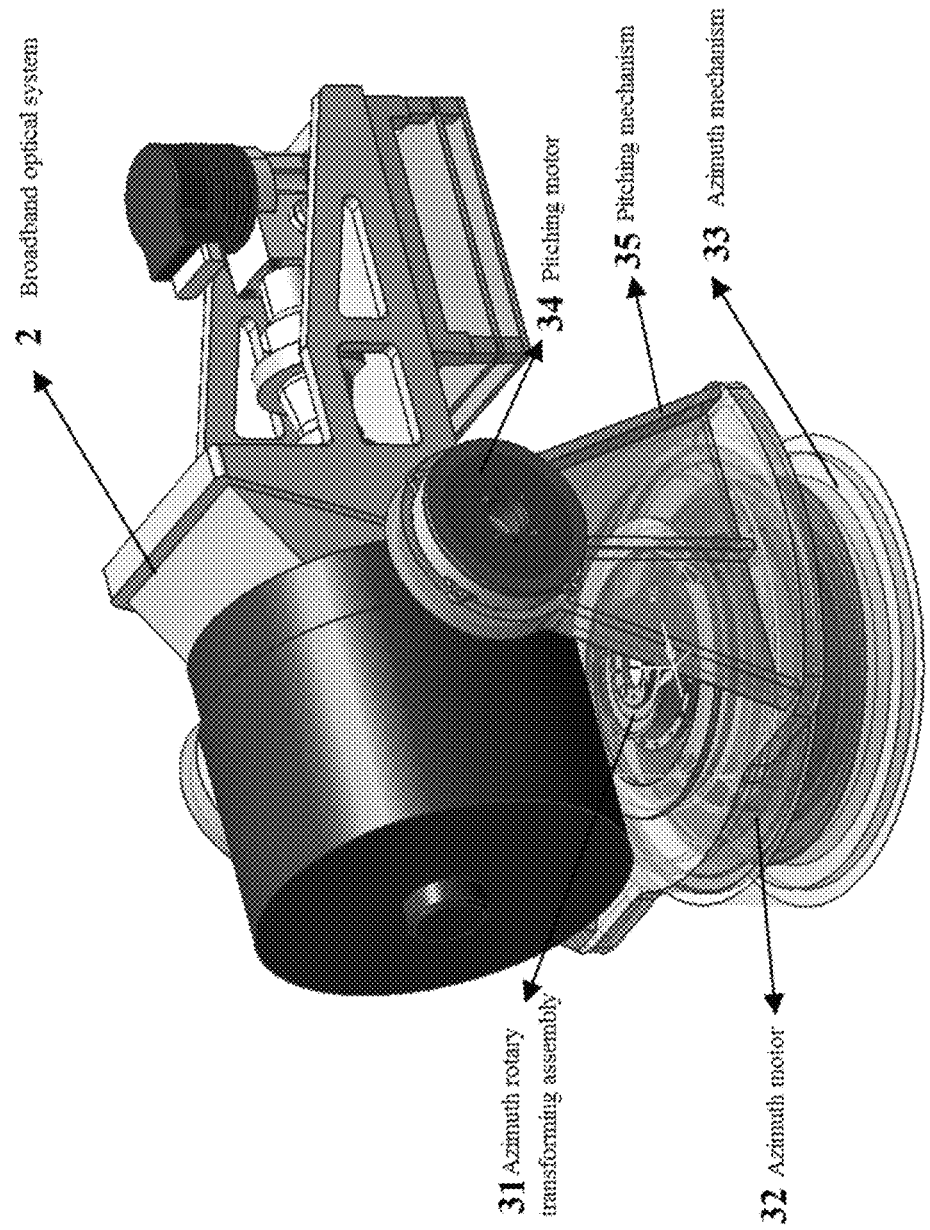
FIG. 4 is a schematic structural diagram of a two-dimensional servo system in an image-spectrum associated detection system provided in an embodiment of the present invention, where a is a three-dimensional configuration, b is a left side view, and c is a right side view.

The two-dimensional servo system 3 includes an azimuth rotary transforming assembly 31, an azimuth motor 32, an azimuth mechanism 33, a pitching motor 34, a pitching mechanism 35, a pitching rotary transforming assembly 36, and a gyroscope 37. The pitching motor 34 and the pitching rotary transforming assembly 36 are respectively disposed at two sides of the pitching mechanism 35, as shown in FIG. 4*a*. The azimuth rotary transforming assembly 31 and the azimuth motor 32 are overlapped and disposed at an axis of the azimuth mechanism 33, and the azimuth mechanism 33 is coupled to the pitching mechanism 35 above it through a mechanical frame, so as to control the broadband optical system 2, thereby implementing pitching and azimuth two-dimensional movements.

Figures 4B, 4C:
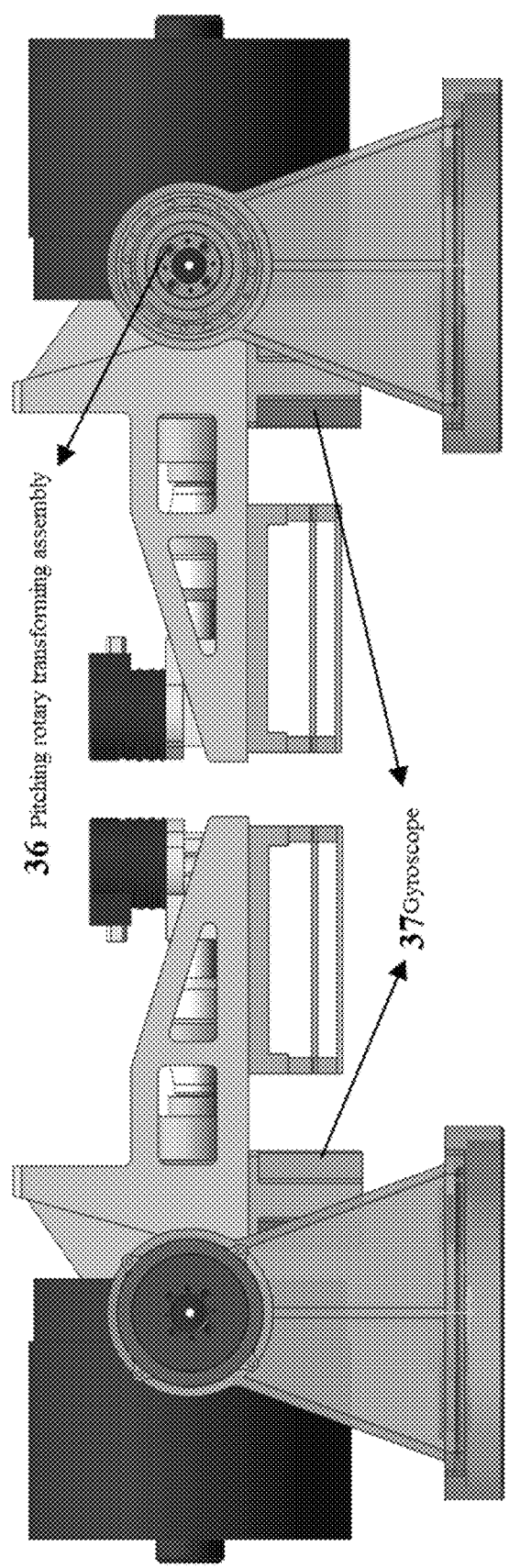
Figure 5:
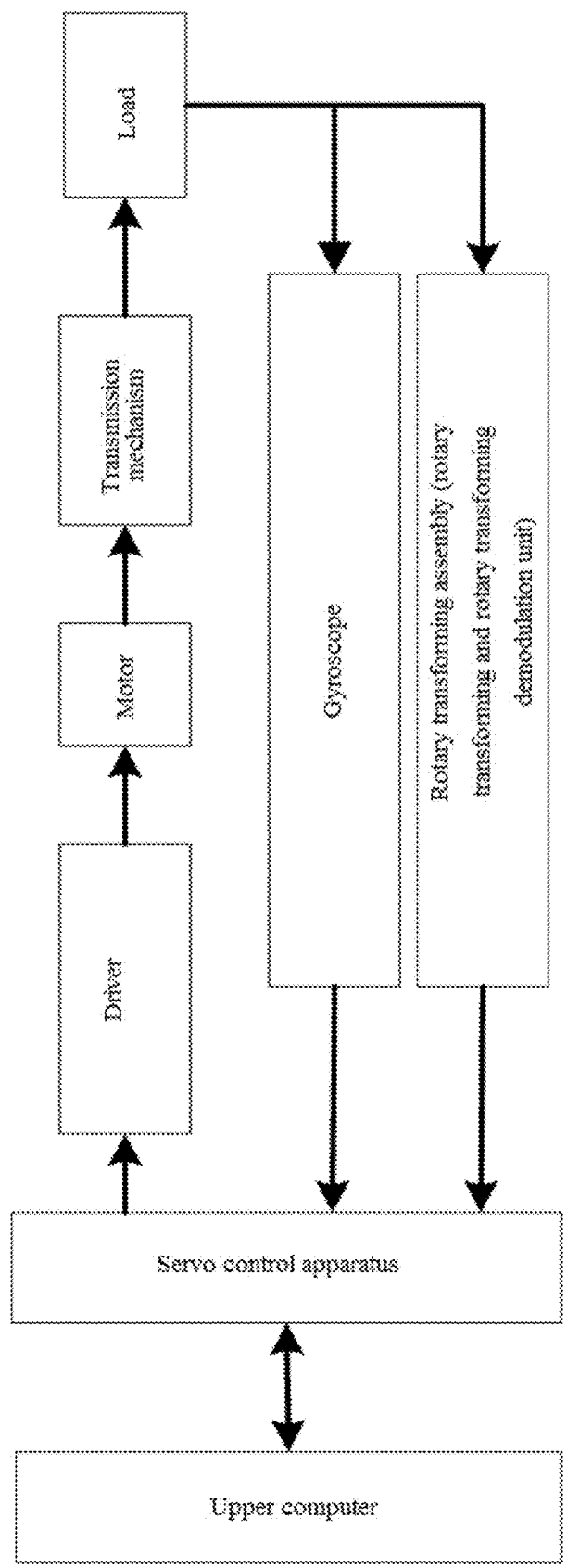
FIG. 5 is a schematic diagram of working logic of a two-dimensional servo system in an image-spectrum associated detection system provided in an embodiment of the present invention.

The gyroscope 37 is disposed under the broadband optical system 2 (FIG. 4*b* and FIG. 4*c*), for measuring a spatial absolute angular velocity of the broadband optical system 2 and an angle tracking error signal of the platform, and using them as feedback signals to implement disturbance decoupling and movement isolation. In the embodiment of the present invention, the gyroscope 37 adopts a fiber-optic gyroscope, which has a strong anti-overload ability and adequate cost.

The two-dimensional servo system 3 uses a position and speed dual-loop feedback control solution (as shown in FIG. 4). In a searching mode, the gyroscope provides an angular position measurement signal of a payload, and implements searching of a given range by position feedback control. In a tracking mode, relative movements of the target and the payload form position feedback, and a spatial absolute angular velocity of a gyroscope sensitive payload is used as a velocity feedback. The gyroscope measures the angle tracking error signal of the platform, and control the detector to move through a correcting apparatus and a dual-loop feedback, thereby implementing dual-plane tracking on the target. When a carrier disturbance occurs, a gyroscope channel ensures that a payload orientation is decoupled from carrier movement, thereby implementing a stable visual axis pointing function.

Figure 6:
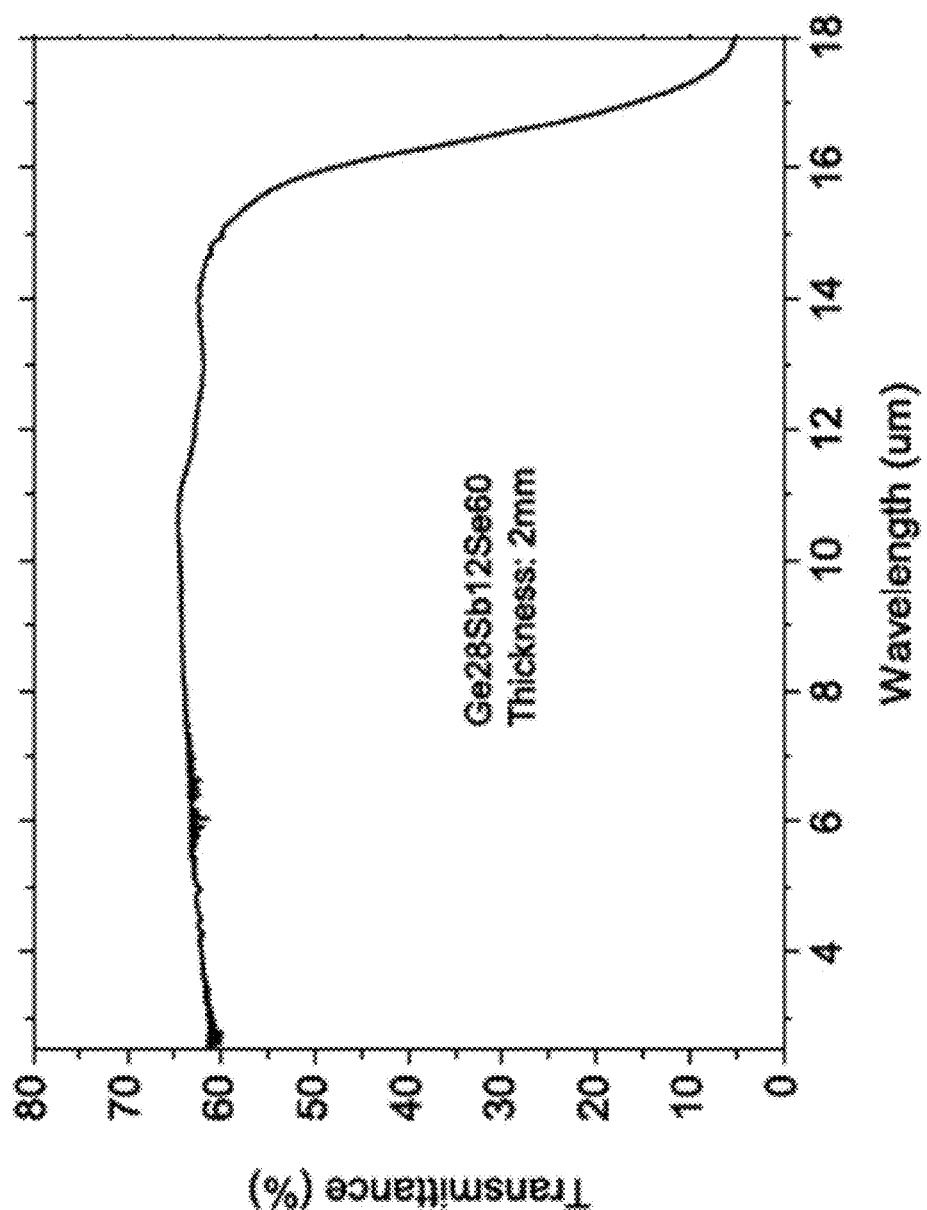
FIG. 6 is a breakthrough curve of an infrared optical fiber in an image-spectrum associated detection system provided in an embodiment of the present invention.

The infrared optical fiber 4 is used for implementing coupling of a broadband spectral energy collection system and a spectrum measurement system, in the embodiment of the present invention, a chalcogenide glass optical fiber is used, and a spectrum breakthrough curve thereof is shown in FIG. 6.

The Fourier interference spectrum module 5 is used for performing interference sampling on the incident light, and acquiring an infrared spectrum through Fourier transform. In the embodiment of the present invention, a spectrum detecting unit EM27 or a process control spectrum measurement system IRCube OEM of Bruker Optics of Germany can be used, both of which adopt a michelson interferometer system, the spectrum resolution is optionally 2 cm$^{-1}$, 4 cm$^{-1}$, 8 cm$^{-1}$, 16 cm$^{-1}$ and 32 cm$^{-1}$, the spectrum measurement range includes short, medium and long waves, and a Stirling or liquid-nitrogen cooled MCT detector is used.

Figure 7:
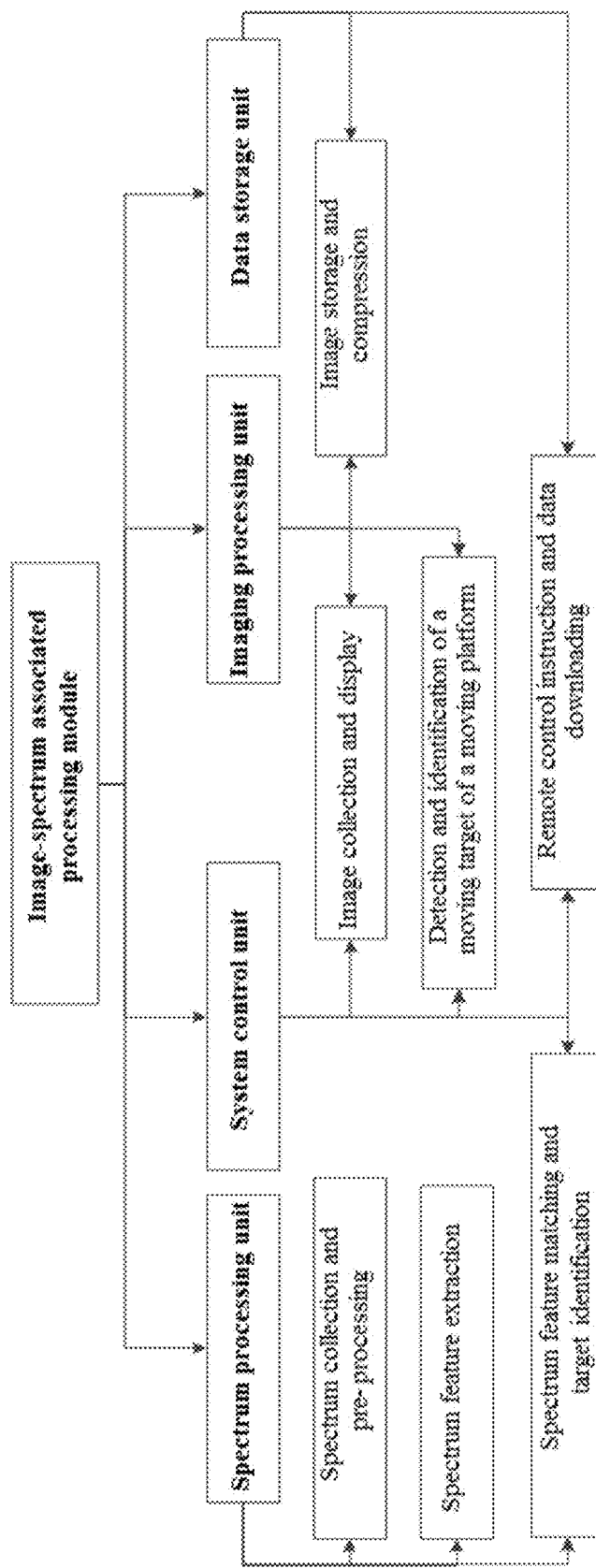
FIG. 7 is schematic functional diagram of an image-spectrum associated information processing module in an image-spectrum associated detection system provided in an embodiment of the present invention.

The image-spectrum associated detection processing module 6 includes an image processing unit 61, a communication level switch unit 62, a system control unit 63, a spectrum processing unit 64, a data storage unit 65, and a data merging total control unit 66, see FIG. 7. The image processing unit 61 mainly performs processing such as image enhancement, feature extraction and segmentation on the collected infrared image, thereby implementing system tracking. The communication level switch unit 62 is interconnected to the outside through the RS422, and mainly implements the level switch function between modules. The system control unit 63 performs motion control on a motor of the two-dimensional servo system 3 through a serial port. The spectrum processing unit 64 performs, through an Ethernet interface, processing such as collection control, data pre-processing, radiometric calibration, and spectrum feature extraction on the infrared spectrum collected by the Fourier interference spectrum module 5. Processing results of the three modules are finally fed back to the data merging total control unit 66 to perform data merging processing; finally an optimal system control strategy is selected to perform data collection, and the data storage unit 65 is used to implement data compression, storage and downloading. At the same time, the data merging total control unit 66 also interacts with the power supply module 7 and the display module 8, so as to implement functions such as configuration parameterization and data visualization.

The data storage unit 65 may receive a ground remote control instruction, thereby facilitating the system being applied to the moving platform. Meanwhile, the data compression storage may greatly reduce the data amount, reduce the data downlink bandwidth pressure, and improve the interference resistance.

The working principle of the present invention is that: light of the target scene is incident from the optical hood 1, enters the broadband optical system 2, is reflected and focused by the primary mirror 22 and the secondary mirror 21, and then split by the spectroscope 23. 50% long-wave infrared light in the incident light passes through the spectroscope 23, is subjected to aberration correction by the long-wave imaging lens group 24, and reaches the infrared detector 26 for imaging. Short and medium-wave infrared light and the other 50% long-wave infrared light in the incident light are reflected by the spectroscope, focused by the broadband spectrum lens group 25 to the infrared optical fiber coupler 27, and is transmitted by the infrared optical fiber 4 to the Fourier interference spectrum module 5 to form an interference pattern, so as to finally acquire an infrared spectrum. The image-spectrum associated detection processing module 6 receives, processes and stores image-spectrum multi-dimensional information of a detection object by using the sub-units, and controls the movement of the two-dimensional servo system 3 to change the orientation of the system optical axis, thereby implementing the detection and tracking on the target. The display module 9 displays image-spectrum information acquired by the current system in a form of a graphic interface by using the data acquired by the image-spectrum associated detection module, and implements a simple man-machine interaction function.

Figure 8:
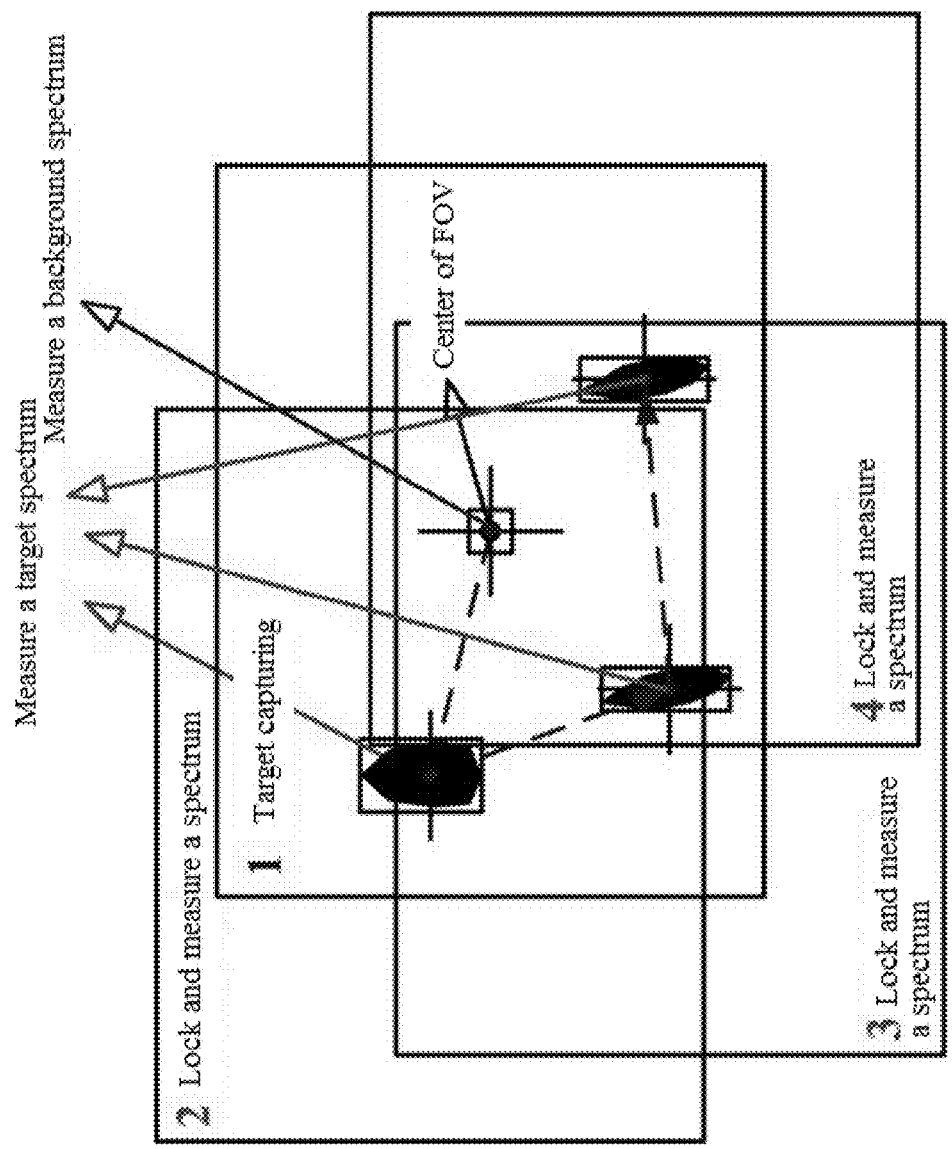
FIG. 8 is a working flow chart of an image-spectrum associated detection system provided in an embodiment of the present invention.

The present invention provides a detection method based on the image-spectrum associated detection system, referring to FIG. 8, including the following steps:

(1) the infrared detector 26 imaging a target scene, and transmitting image data to the image processing unit 61;

(2) the image processing unit 61 extracting all suspected targets and target position coordinate information from an image sequence, and feeding back the information to the data merging total control unit 66;

(3) the data merging total control unit 66 calling the two-dimensional servo system 3, controlling the broadband optical system 2, and sequentially moving a center of FOV to the target positions to lock a target;

(4) after a target is locked, the data merging total control unit 66 calling the spectrum processing unit 64, using the Fourier interference spectrum module 5 to acquire spectral data of the target, and marking that the target has been measured;

(5) repeating steps (1) to (4) and starting the next collection cycle, until collection of all targets is completed.

In the detection method based on the image-spectrum associated detection system provided in the present invention, in the step (2), the suspected target refers to several pixel points closely connected in the image, and an extraction method is determined according to the follows:

(21) performing an enhancement processing on the image; where the objective of image enhancement processing is to highlight a potential target and an area where the potential target locates;

(22) performing an image segmentation processing on the image after the enhancement processing; where the image segmentation processing may be performed by using a threshold segmentation method; and

(23) performing dilation and erosion processing on the image after the segmentation processing, to acquire a region of interest; where the dilation and erosion processing is combining single residual pixel points and eliminating interference factors.

In the detection method based on the image-spectrum associated detection system provided in the present invention, the locking the target in the step (4) is determined according to the following manner:

(41) the center of FOV and the target have a stable relative position relation;

(42) the target is located in a range of 5 pixels from the center of FOV;

It is considered that the locking is successful when the two conditions are met, and it is feasible to start to measure the target spectrum.

The moving platform borne infrared image-spectrum associated detection system and method not only effectively implement associated collection of image and spectrum information, but also can isolate the detection system from the disturbance of the moving platform, thereby quickly implementing target detection, tracking and measurement.

Figure 9B:
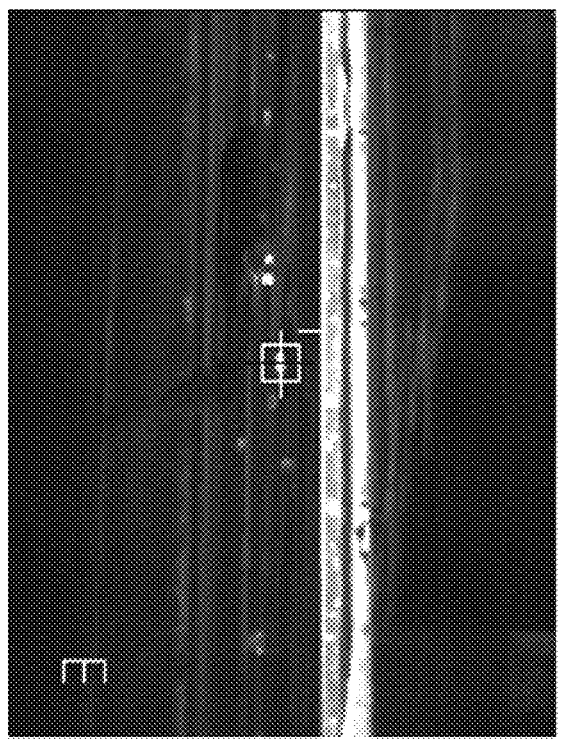
FIG. 9 is a data result of real-time measuring an airport indicator and a civil aircraft in an outdoor experiment of the present invention, where, in a, an optical axis is aligned to a right-side engine of a civil aircraft sliding on a runway of an airport, in b, an optical axis is aligned to a ground indicator of the airport, and c shows spectrums of flame of the engine of the civil aircraft and the indicator corresponding to a and b.
Figure 9A:
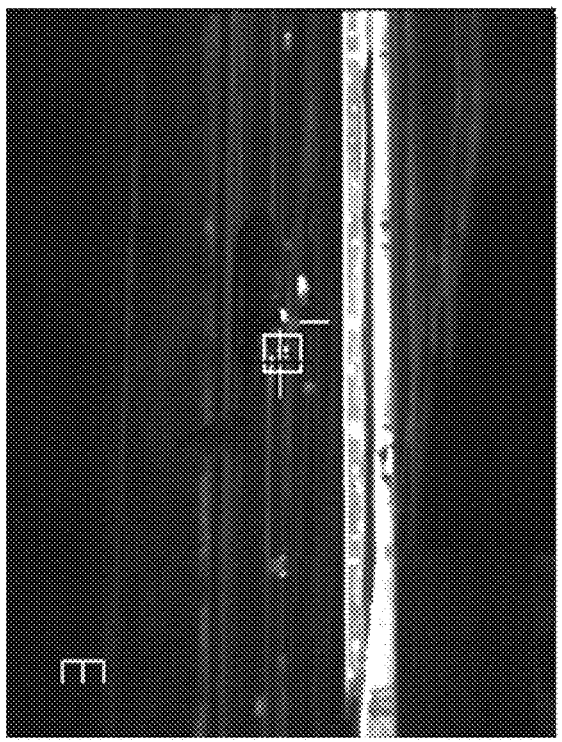
Figure 9C:
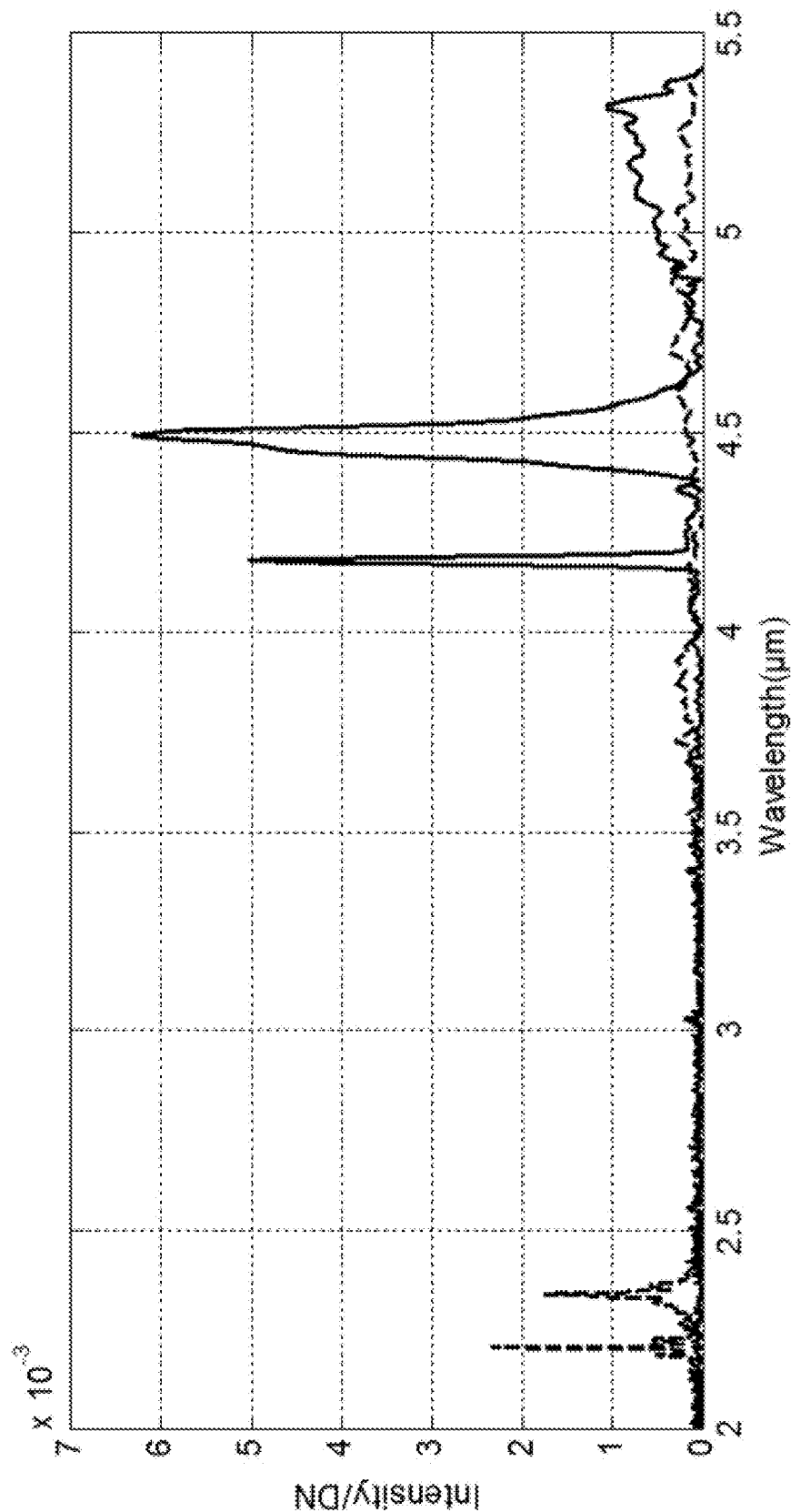

FIG. 9 shows results of field measurement of the image-spectrum associated detection system provided in the present invention at an airport. FIG. 9a and FIG. 9b show a sliding process and a take-off process of a civil aircraft on a runway, and in this case, an engine of the aircraft is in a started state, in FIG. 9a, the FOV locks the engine nozzle at the right side of the aircraft, and in FIG. 9b, the FOV locks a ground indicator. FIG. 9c is infrared spectrums collected after the above targets are locked, and an interval thereof is 2 μm-5 μm. It can be seen from the spectrum curve features of FIG. 9c that, the aircraft radiation spectrum has obvious wave peaks at 4.18 μm and 4.5 μm, and the ground indicator has two relatively smaller wave peaks at 2.2 μm and 2.35 μm.

A person skilled in the art can easily understand that the above descriptions are merely preferred embodiments of the present invention, and are not intended to limit the present invention. Any modification, equivalent replacement and improvement made without departing from the spirit and principle of the present invention shall all fall within the protection scope of the present invention.

The invention claimed is:

1. A moving platform borne infrared image-spectrum associated detection system, wrapped in a protective shell, comprising:
   an optical hood connected to the protective shell through an adhesive;
   a two-dimensional servo system having a base, the base fixedly mounted in the protective shell;
   a broadband optical system, a centroid of the broadband optical system is overlapped with a center of sphere of the optical hood, and the broadband optical system is fixed to a pitching mechanism of the two-dimensional servo system to implement two-dimensional movements, the broadband optical system including:
      a secondary mirror and a primary mirror placed sequentially and coaxially forming a Cassegrain lens,
      a spectroscope, a mirror plane center of the spectroscope is overlapped with a center axis of the system, a mirror plane of the spectroscope is placed to form an angle of 45° with the center axis, a first surface of the spectroscope is coated with a beam splitting film, and a second surface thereof is coated with a long-wave antireflection film,
      a long-wave lens group located on a transmission optical path of the spectroscope, for long-wave imaging,
      a broadband spectrum lens group, located on a reflection optical path of the spectroscope, for correcting chromatic aberration of position and chromatic aberration of magnification of broadband spectrum imaging, thereby implementing collection of spectral energy,
      an infrared detector, disposed at the tail portion of the long-wave lens group, and an exit pupil of the long-wave lens group is overlapped with an internal photosurface of the infrared detector, and
      an infrared optical fiber coupler disposed at the rear portion of the broadband spectrum lens group, an end surface of the infrared optical fiber coupler is overlapped with an exit pupil of the broadband spectrum lens group;
   a Fourier interference spectrum module fixed in the protective shell with a spring;
   an infrared optical fiber flexibly connected to the broadband optical system and the Fourier interference spectrum module respectively;
   an image-spectrum associated detection processing module;
   a power supply module configured to supply power to the moving platform borne infrared image-spectrum associated detection system and to provide a universal power interface; and
   a display module embedded in an outer surface at a tail portion of the protective shell,
   wherein a center of gyration of the two-dimensional servo system is overlapped with a centroidal axis of the broadband optical system.

2. The moving platform borne infrared image-spectrum associated detection system according to claim 1, wherein, the optical hood is a spherical structure formed by using a zinc sulfide material as a base material, and performing machine shaping, polishing, and coating.

3. The moving platform borne infrared image-spectrum associated detection system according to claim 1, wherein, the long-wave lens group comprises a first concave lens, a second concave lens, a first planoconvex lens, a third concave lens and a second planoconvex lens that are disposed sequentially and coaxially.

4. The moving platform borne infrared image-spectrum associated detection system according to claim 1, wherein, the broadband spectrum lens group comprises two concave lenses and a crescent convex lens disposed sequentially and coaxially, and followed by two planoconvex lenses.

5. The moving platform borne infrared image-spectrum associated detection system according to claim 1, wherein, the two-dimensional servo system comprises an azimuth rotary transforming assembly, an azimuth motor, an azimuth mechanism, a pitching motor, a pitching mechanism, a pitching rotary transforming assembly, and a gyroscope;
  the pitching motor and the pitching rotary transforming assembly are respectively disposed at two sides of the pitching mechanism;
  the azimuth rotary transforming assembly and the azimuth motor are overlapped and disposed at an axis of the azimuth mechanism, and the azimuth mechanism is coupled to the pitching mechanism above it through a mechanical frame, so as to control the broadband optical system, thereby implementing pitching and azimuth two-dimensional movements; and
  the gyroscope is disposed under the broadband optical system, for measuring a spatial absolute angular velocity of the broadband optical system and an angle tracking error signal of the platform, and using them as feedback signals to implement disturbance decoupling and movement isolation.

6. The moving platform borne infrared image-spectrum associated detection system according to claim 5, wherein the gyroscope is a fiber-optic gyroscope.

7. A moving platform borne infrared image-spectrum associated detection system, wrapped in a protective shell, comprising:
  an optical hood connected to the protective shell through an adhesive;
  a two-dimensional servo system having a base, the base fixedly mounted in the protective shell;
  a broadband optical system, a centroid of the broadband optical system is overlapped with a center of sphere of the optical hood, and the broadband optical system is fixed to a pitching mechanism of the two-dimensional servo system to implement two-dimensional movements, the broadband optical system including:
    a secondary mirror and a primary mirror placed sequentially and coaxially forming a Cassegrain lens,
    a spectroscope, a mirror plane center of the spectroscope is overlapped with a center axis of the system, a mirror plane of the spectroscope is placed to form an angle of 45° with the center axis, a first surface of the spectroscope is coated with a beam splitting film, and a second surface thereof is coated with a long-wave antireflection film,
    a long-wave lens group located on a transmission optical path of the spectroscope, for long-wave imaging, wherein the long-wave lens group comprises a first concave lens, a second concave lens, a first planoconvex lens, a third concave lens and a second planoconvex lens that are disposed sequentially and coaxially,
    a broadband spectrum lens group, located on a reflection optical path of the spectroscope, for correcting chromatic aberration of position and chromatic aberration of magnification of broadband spectrum imaging, thereby implementing collection of spectral energy,
    an infrared detector, disposed at the tail portion of the long-wave lens group, and an exit pupil of the long-wave lens group is overlapped with an internal photosurface of the infrared detector, and
    an infrared optical fiber coupler disposed at the rear portion of the broadband spectrum lens group, an end surface of the infrared optical fiber coupler is overlapped with an exit pupil of the broadband spectrum lens group;
  a Fourier interference spectrum module fixed in the protective shell with a spring;
  an infrared optical fiber flexibly connected to the broadband optical system and the Fourier interference spectrum module respectively;
  an image-spectrum associated detection processing module;
  a power supply module configured to supply power to the moving platform borne infrared image-spectrum associated detection system and to provide a universal power interface; and
  a display module embedded in an outer surface at a tail portion of the protective shell,
  wherein a center of gyration of the two-dimensional servo system is overlapped with a centroidal axis of the broadband optical system.

8. A moving platform borne infrared image-spectrum associated detection system, wrapped in a protective shell, comprising:
  an optical hood connected to the protective shell through an adhesive;
  a two-dimensional servo system having a base, the base fixedly mounted in the protective shell;
  a broadband optical system, a centroid of the broadband optical system is overlapped with a center of sphere of the optical hood, and the broadband optical system is fixed to a pitching mechanism of the two-dimensional servo system to implement two-dimensional movements, the broadband optical system including:
    a secondary mirror and a primary mirror placed sequentially and coaxially forming a Cassegrain lens,
    a spectroscope, a mirror plane center of the spectroscope is overlapped with a center axis of the system, a mirror plane of the spectroscope is placed to form an angle of 45° with the center axis, a first surface of the spectroscope is coated with a beam splitting film, and a second surface thereof is coated with a long-wave antireflection film,
    a long-wave lens group located on a transmission optical path of the spectroscope, for long-wave imaging,
    a broadband spectrum lens group, located on a reflection optical path of the spectroscope, for correcting chromatic aberration of position and chromatic aberration of magnification of broadband spectrum imaging, thereby implementing collection of spectral energy, the broadband spectrum lens group comprising two concave lenses and a crescent convex lens disposed sequentially and coaxially, and followed by two planoconvex lenses,
    an infrared detector, disposed at the tail portion of the long-wave lens group, and an exit pupil of the long-wave lens group is overlapped with an internal photosurface of the infrared detector, and
    an infrared optical fiber coupler disposed at the rear portion of the broadband spectrum lens group, an end surface of the infrared optical fiber coupler is overlapped with an exit pupil of the broadband spectrum lens group;
  a Fourier interference spectrum module fixed in the protective shell with a spring;
  an infrared optical fiber flexibly connected to the broadband optical system and the Fourier interference spectrum module respectively;

an image-spectrum associated detection processing module;
a power supply module configured to supply power to the moving platform borne infrared image-spectrum associated detection system and to provide a universal power interface; and
a display module embedded in an outer surface at a tail portion of the protective shell,
wherein a center of gyration of the two-dimensional servo system is overlapped with a centroidal axis of the broadband optical system.

9. A moving platform borne infrared image-spectrum associated detection system, wrapped in a protective shell, comprising:
an optical hood connected to the protective shell through an adhesive;
a two-dimensional servo system having a base, the base fixedly mounted in the protective shell;
a broadband optical system, a centroid of the broadband optical system is overlapped with a center of sphere of the optical hood, and the broadband optical system is fixed to a pitching mechanism of the two-dimensional servo system to implement two-dimensional movements;
a Fourier interference spectrum module fixed in the protective shell with a spring;
an infrared optical fiber flexibly connected to the broadband optical system and the Fourier interference spectrum module respectively;
an image-spectrum associated detection processing module;
a power supply module configured to supply power to the moving platform borne infrared image-spectrum associated detection system and to provide a universal power interface; and
a display module embedded in an outer surface at a tail portion of the protective shell,
wherein a center of gyration of the two-dimensional servo system is overlapped with a centroidal axis of the broadband optical system, and
wherein the two-dimensional system includes:
an azimuth rotary transforming assembly,
an azimuth motor,
an azimuth mechanism,
a pitching motor,
a pitching mechanism,
a pitching rotary transforming assembly, the pitching motor and the pitching rotary transforming assembly respectively disposed at two sides of the pitching mechanism, and
a gyroscope disposed under the broadband optical system, for measuring a spatial absolute angular velocity of the broadband optical system and an angle tracking error signal of the platform, and using them as feedback signals to implement disturbance decoupling and movement isolation, the azimuth rotary transforming assembly and the azimuth motor are overlapped and disposed at an axis of the azimuth mechanism, and the azimuth mechanism is coupled to the pitching mechanism above it through a mechanical frame, so as to control the broadband optical system, thereby implementing pitching and azimuth two-dimensional movements.

10. A moving platform borne infrared image-spectrum associated detection system, wrapped in a protective shell, comprising:
an optical hood connected to the protective shell through an adhesive;
a two-dimensional servo system having a base, the base fixedly mounted in the protective shell;
a broadband optical system, a centroid of the broadband optical system is overlapped with a center of sphere of the optical hood, and the broadband optical system is fixed to a pitching mechanism of the two-dimensional servo system to implement two-dimensional movements;
a Fourier interference spectrum module fixed in the protective shell with a spring;
an infrared optical fiber flexibly connected to the broadband optical system and the Fourier interference spectrum module respectively;
an image-spectrum associated detection processing module;
a power supply module configured to supply power to the moving platform borne infrared image-spectrum associated detection system and to provide a universal power interface; and
a display module embedded in an outer surface at a tail portion of the protective shell,
wherein a center of gyration of the two-dimensional servo system is overlapped with a centroidal axis of the broadband optical system, and
wherein the two-dimensional system includes:
an azimuth rotary transforming assembly,
an azimuth motor,
an azimuth mechanism,
a pitching motor,
a pitching mechanism,
a pitching rotary transforming assembly, the pitching motor and the pitching rotary transforming assembly respectively disposed at two sides of the pitching mechanism, and
a fiber optic gyroscope disposed under the broadband optical system, for measuring a spatial absolute angular velocity of the broadband optical system and an angle tracking error signal of the platform, and using them as feedback signals to implement disturbance decoupling and movement isolation, the azimuth rotary transforming assembly and the azimuth motor are overlapped and disposed at an axis of the azimuth mechanism, and the azimuth mechanism is coupled to the pitching mechanism above it through a mechanical frame, so as to control the broadband optical system, thereby implementing pitching and azimuth two-dimensional movements.

* * * * *